United States Patent [19]

Post

[11] 3,796,498
[45] Mar. 12, 1974

[54] POSITION MEASURING THROUGH THE USE OF MOIRE FRINGE MULTIPLICATION

[76] Inventor: Daniel Post, Box 408, Averill Park, N.Y. 12018

[22] Filed: May 14, 1971

[21] Appl. No.: 143,561

[30] Foreign Application Priority Data

Oct. 19, 1970 Great Britain.................. 49,478/70

[52] U.S. Cl..................... 356/169, 250/237 G
[51] Int. Cl. ........................................... G01b 11/04
[58] Field of Search............... 356/106 R, 169, 151; 250/237 G

[56] References Cited
UNITED STATES PATENTS

| | | | |
|---|---|---|---|
| 2,886,718 | 5/1959 | Shepherd et al.................. | 356/169 |
| 3,482,107 | 12/1969 | Hock.................................. | 356/169 |
| 3,572,937 | 3/1971 | Baldwin............................. | 356/110 |
| 3,574,292 | 4/1971 | Butts................................. | 356/106 |
| 3,586,665 | 6/1971 | Weyrauch.......................... | 356/169 |
| 3,588,462 | 6/1971 | Kreckel............................. | 356/169 |

OTHER PUBLICATIONS

Jenkins and White, Fundamentals of Optics, 3rd Ed., McGraw-Hill Book Company, Inc., N.Y. (1957) pp. 239-241.

Langenbeck, Higher-Order Lloyd Interferometer, Applied Optics, Vol. 9, No. 8 (August 1970) pp. 1838-1841.

Oster, Moire Processing of Biological Data, Annals of the N.Y. Academy of Sciences, Vol. 157, Art. 1 (March 31, 1969) pp. 83-96.

Primary Examiner—William L. Sikes
Attorney, Agent, or Firm—Karl W. Flocks

[57] ABSTRACT

A system for linear and angular measurements utilizing a form of moire fringe multiplication particularly in position measuring apparatus. The position of a table is determined by moire fringe multiplication with a coarse scale grating, an index member in juxtaposition with said scale grating, illumination, optical filtering, and observing means and means to indicate relative position of the table from changes of the said moire fringes.

16 Claims, 8 Drawing Figures

PATENTED MAR 12 1974
3,796,498
SHEET 1 OF 3

INVENTOR
DANIEL POST

BY Karl W. Flocks

ATTORNEY

INVENTOR
DANIEL POST

BY *Karen W. Flocks*

ATTORNEY

INVENTOR
DANIEL POST

BY Karl W. Flocks
ATTORNEY

POSITION MEASURING THROUGH THE USE OF MOIRE FRINGE MULTIPLICATION

BACKGROUND OF THE INVENTION

In the prior art, precision linear positioning and measuring has been accomplished by the following methods; angular positioning and measuring has been accomplished by variations of these methods:

1. Precision screw and nut devices. With this method, precision screws must each be manufactured and corrected as originals—no replicating process is applicable and cost is high. Screws and nuts are susceptible to changing accuracy with age from wear and changing friction characteristics. Periodic maintenance — principally cleaning and lubrication — is maximal. The system is highly susceptible to error associated with variations of forces in machine tool operations. 2. Scale and index mark devices. This system is characteristically highly stable. Its primary source of error stems from random irregularities in positions of markings on the scale.

3. Moire scale and index devices. This method is similar to 2 above, but the scale and index elements are diffraction gratings, with ruling frequencies usually equal, but sometimes in the ratio of small integers, e.g., 1:2. The output is in the form of mechanical or optical interference fringes, called moire fringes. Small relative motion of the gratings induces large motion of the fringes. These fringes are readily sensed by photodetectors and interpreted by pulse counters, and therefore the moire method is highly compatible with automated measurement and control systems. A fundamental advantage of moire is the averaging effect, wherein the output signal depends upon the average position of all the index grating rulings relative to the adjacent scale grating rulings. Random irregularities in positions of rulings are cancelled; they have no effect on moire fringe position, and only minor effect on fringe contrast. A primary disadvantage of the moire method is the low sensitivity of systems employing relatively inexpensive scale gratings, and conversely, the extremely high cost and fragile nature of scale gratings required for systems of high sensitivity.

4. Optical interferometer devices. The advent of the laser has allowed optical interferometers to become practical measuring devices for industrial applications. Interferometers have the advantage of being highly sensitive, typically about 12.4 micro-inches per fringe. However, they are highly susceptible to errors introduced by variations of wavelength of the light employed, variations of refractive index of the air in the space separating interferometer mirrors, and out-of-plane vibrations of interferometer mirrors. The provisions required to minimize these sources of error — including stabilized lasers, barometric pressure compensation, environmental control — are extremely expensive. Still, these errors limit the accuracy of laser interferometry to about one part per million, whereas the theoretical accuracy is orders of magnitude greater for measurements of long paths. The system is restricted, too, in that its basic range of sensitivity is not widely adjustable, but limited by the availability of suitable light sources.

SUMMARY OF THE INVENTION

The object of the present invention is to provide a highly versatile, highly sensitive and highly stable system for linear and angular measurements. The system utilizes special forms of moire fringe multiplication. Sensitivity can closely approach that of optical interferometry while the stability inherent in mechanical scales is maintained. The system has special applicability to the microelectronics industry, which requires ultraprecise positioning and measuring across moderate distances and the machine tool industry, which requires precise positioning and measuring across large distances.

The moire fringe multiplication as performed in this invention provides one to two orders of magnitude increase of sensitivity of the moire method, while retaining a relatively coarse, robust and inexpensive scale grating. The sensitivity is readily variable, and it can closely approach the sensitivity of a double path optical interferometer. Accuracy exceeding one part per million is practical.

The measuring system is not subject to wear or degradation with age; it is insensitive to random errors of ruling positions; its sensitivity and accuracy are not unduly influenced by wavelength and wavelength spread of the light source, nor by refractive index and barometric pressure of the surrounding medium, nor by out-of-plane vibrations of the gratings. The scale grating can be made very long. The scale grating and index member can be separated by a gap sufficiently large for convenient set-up and operation. The moire fringes and output signal are independent of changes of thickness and taper of the gap between scale grating and index member; they depend only upon the in-plane component of motion of the scale grating normal to its rulings.

BRIEF DESCRIPTION OF THE DRAWINGS

The above and additional objects and advantages inherent in the present invention will become apparent by reference to the description and drawings of which.

DESCRIPTION OF THE PREFERRED EMBODIMENTS

Figure 1:
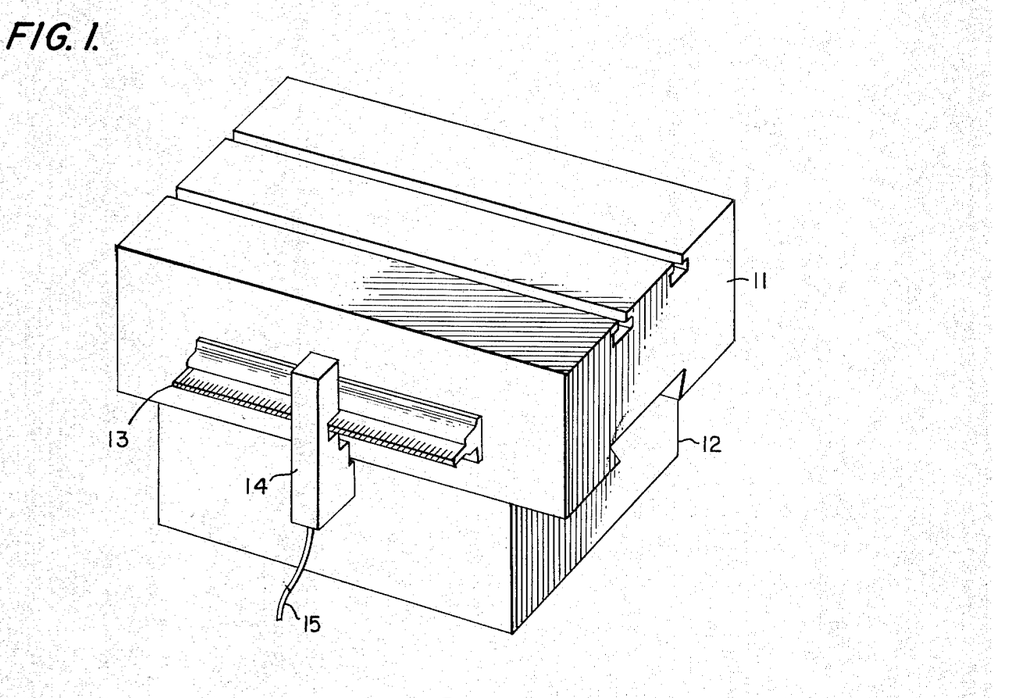
FIG. 1 illustrates the external appearance of one form of this apparatus.

In FIG. 1, table 11 translates with respect to its base 12. A scale grating 13 is attached to said table with its width parallel to the axis of translation. Housing 14, which is fixed to base 12, contains an index grating with rulings approximately parallel to the rulings of the scale grating, (or it contains an equivalent prism) and an illuminating, optical filtering and receiving system. Cable 15 provides conductors for power input and signal output.

Two such systems can be assembled together for biaxial motions and three for triaxial motions. Similar systems may be used for angular displacements, wherein the scale grating is circular and concentric with the center of rotation; the scale grating may be cylindrical, with rulings parallel to the axis of rotation, or it may be plane, with rulings radiating from the axis of rotation.

Figure 2:
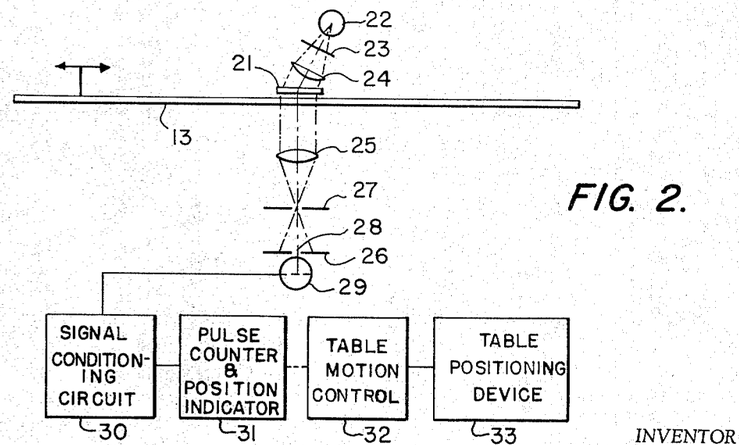
FIG. 2 is a schematic representation of one form of the optical system and signal processing components.

Contents of housing 14 are represented in FIG. 2. These comprise index grating 21 mounted essentially parallel to scale grating 13. Light from concentrated source 22 is rendered approximately monochromatic by filter 23 and collimated by lens 24, so as to impinge on the index grating in the desired direction of incidence. Emergent light is decollimated by lens 25 and focused to form an image of moire fringes on image plane 26. Aperture plate 27 is located in the focal plane of lens 25 and functions as an optical filter by passing the desired family of diffracted rays and stopping all other families. Aperture 28 in image plane 26 is a slit orientated parallel to the moire fringes, allowing light into the photodetector 29. As scale grating 13 translates with respect to index grating 21, the moire multiplication effect causes alternately intense and dim light to fall on slit 28, and in turn, causes correspondingly high and low electrical output from photodetector 29.

This modulated electrical output is treated by a signal conditioning circuit 30 and fed into a pulse counter and position indicator 31, known in the prior art. The modulated signal may also be fed into a cable motion controller 32, and cause it to actuate a table positioning device 33 according to a predetermined program.

The pulse counter may utilize two observations and signals from the moire pattern, for example, observations at locations one-fourth moire fringe apart. Then, two slits may be used in the image plane, and two photodetectors may be used according to techniques known in the prior art. Other known techniques utilizing more than one optical signal may be used to afford fringe interpolation and discrimination between forward and backward movement of the scale grating.

Figure 3:
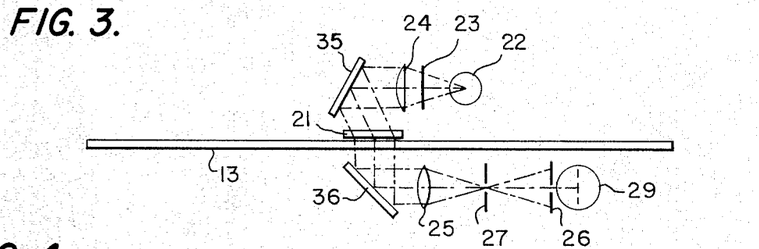
FIG. 3 is a schematic representation of an alternate arrangement of the optical system.

In FIG. 3, mirrors 35 and 36 are used to fold the optical path for applications in which a more compact physical design is desired. Other optically equivalent but physically different designs are possible.

Figure 4:
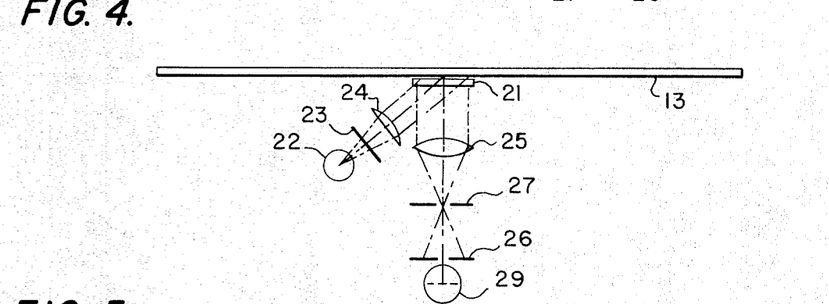
FIG. 4 is a schematic representation of another alternate arrangement of the optical system.

In FIG. 4 the apparatus is arranged to observe the moire fringes formed by light reflected back from the gratings.

A primary contribution of this invention is the optical configuration of a particular moire fringe multiplication system, ideally suited for position measuring apparatus. This optimum configuration is specified in following paragraphs and tests of its performance are described thereafter.

OPTIMUM OPTICAL CONFIGURATION

Figure 5:
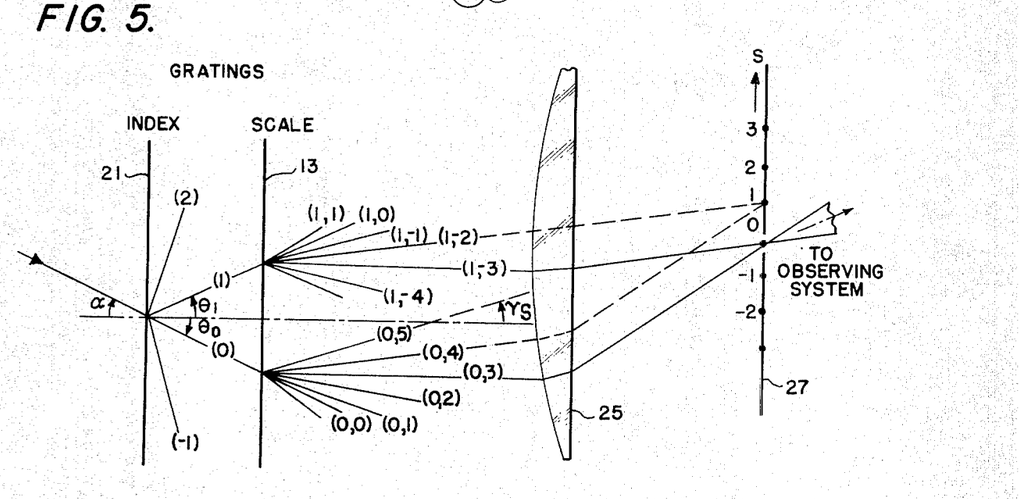
FIG. 5 illustrates the diffraction of light for the optimum configuration of moire fringe multiplication elements.

The optical configuration is illustrated in FIG. 5. The fine index grating 21 exhibits dominant diffraction in two neighboring orders, usually the zeroth and first orders — but for generality, let the dominant orders be $a$ and $a+1$. Illumination is by a beam of collimated light whose plane of incidence is perpendicular to the rulings. Angle of incidence $\alpha$ is so arranged that the normal to the index grating bisects the angle between dominant diffraction orders. Then, angle of incidence is given by $$\sin \alpha = -(a+\tfrac{1}{2})\lambda/g_f \quad (1)$$

and the dominant diffraction angles by $$\sin \theta_a = -\lambda/2g_f,$$
$$\sin \theta_{a+1} = \lambda/2g_f \quad (2)$$

where $\lambda$ is wavelength of the monochromatic light employed and $g_f$ is pitch of the index grating; acute angles are positive if rotation from the reference axis to the ray is counterclockwise; diffraction angles increase as $a$ increases.

Since $\theta_a = -\theta_{a+1} \quad (3)$ light of the dominant diffraction orders is symmetrically disposed with respect to the grating normal. In practice, the prescribed angle of incidence usually can be set by adjusting the position of back-reflected images of the source with respect to the source itself.

The pitch of the coarse scale grating is approximately $\beta$ times greater than the pitch of the reference grating, where $\beta$ is a whole number which is not necessarily small, for example, a number between 3 and 100; in the Figure $\beta = 6$. $\beta$ is defined as the fringe multiplication factor.

The coarse or scale grating should preferably exhibit symmetrical diffraction intensities with respect to its zeroth order. This condition is automatically satisfied with an amplitude grating (Ronchi ruling or bar-and-space grating with opaque or semi-transparent bars) and with a bar-and-space phase grating (transparent bars typically producing one-half cycle phase retardation). The coarse or scale grating is positioned on the observer side of the fine or index grating, and oriented with nearly parallel grating surfaces and nearly parallel rulings. The gap between gratings would usually be small, for example, from zero to one mm.

Parenthesized numerals attached to diffracted rays in FIG. 5 indicate the diffraction orders experienced by the ray, and a pair of numbers separated by a comma indicate diffraction orders experienced at the index and scale gratings, respectively.

Angles of diffraction, $\gamma$, of light emerging from the scale grating, measured from the normal to the grating, are given by $$\sin \gamma_q = q\lambda/g_c + \sin \theta_p \quad (4)$$

where $p$ and $q$ are the corresponding diffraction orders experienced at the index and scale gratings, respectively, and $g_c$ is pitch of the scale grating. In practice, the pitches are related, either exactly or very nearly, by $$g_c = \beta g_f \quad (5)$$

Thus, rays of order sequence $(a, \beta/2)$ and $(a+1, -\beta/2)$ are found by combining Eqs. 2, 4 and 5 to emerge in the direction $\gamma = 0$. They emerge parallel to the axis of the optical system and converge at point 0 on the optical axis of the decollimating lens 25. This is illustrated in FIG. 5 for rays of order sequence (0,3) and (1,−3), since here $a = 0$ and $\beta = 6$.

Similarly, pairs of rays that experience orders $(a, \beta/2 + s)$ and $(a+1, -\beta/2 + s)$, where $s$ is a whole number, positive or negative and including zero, emerge in the direction given by $$\sin \gamma_s = s\lambda/g_c \qquad (6)$$

Thus, each pair of rays having a given value of $s$ are parallel and converge to a point in the focal plane of lens 25. In FIG. 5, the pair of rays for which $s = 1$ is shown by dashed lines, and these rays converge to point 1. Similarly, pairs for each value of s converge to separate correspondingly numbered points. Such combinations of rays will be called $s$-groups.

Light rays originating from non-dominant diffraction orders at the fine grating also become members of each $s$-group—for example rays of −1, 9 and 2, −9 diffraction orders in FIG. 1 enter the $s = 0$ group. However, these members carry negligible energy compared to the strong members, and are disregarded. Aperture plate 27 is located in the focal plane of lens 25, and functions as an optical filter so as to isolate light in any $s$-group for observation. In practice, this aperture plate is usually positioned to admit rays of groups $s = 0$.

TESTS OF PERFORMANCE

Dependence Upon S-Group

The optical arrangement depicted in FIGS. 2 and 5 was used. The index or fine grating 21 was phase type with 1,200 rulings per mm, exhibiting dominant diffraction in zeroth and first orders. The coarse scale grating 13 was a Ronchi ruling of 20 rulings per mm. This bar-and-space ruling consisted of opaque bars of evaporated chromium on a glass substrate; widths of opaque bars and clear spaces were equal.

The index grating was 5 cm diameter and the specimen grating was 2.5 cm long by 10 cm wide. A field of view approximately 5 cm wide and 2.5 cm high was observed.

Paper spacers were placed between the gratings, providing a wedge-shaped gap between the grating surfaces. Gap thickness was 0.05 mm on one end and 0.10 mm on the other end 5 cm away. The apex of the wedge-shaped gap was approximately parallel to the rulings.

The scale grating was rotated in its plane to minimize the number of moire fringes across the field. Seven fringes appeared in the field of view when group $s = 0$ was observed. Fringe contrast was high.

Observations were made in numerous s-groups surrounding zero. The decollimating lens 25 and aperture plate 27 were mounted on a common track that pivoted about a point near the gratings. Thus, the track was rotated to the position where the aperture plate admitted the desired $s$-group. An image of the moire pattern was formed in a camera located behind aperture plate 27 and observed with a focusing magnifier in the camera image plane.

Fringes had sufficient contrast in $s$-groups −10 through 13 for meaningful interpretation. No changes were observed in fringe count, inclination or shape, over the whole range of observations.

Fringe contrast varied with $s$-group. Also, the positions of intensity minima varied with $s$-group observed—notably, positions of intensity maxima and minima interchanged in odd and even $s$-groups near $s = 0$. Since one is always interested in the difference between moire fringe orders appearing in one particular $s$-group, this shift of fringe centers is unimportant.

These results show that the moire pattern is independent of angular position of observation near $s = 0$ (when angle of incidence is as prescribed).

Sensitivity

Separate observations were made with five different index gratings 21 of frequencies 200 to 1,200 rulings per mm, mounted in series with the 20 rulings per mm chromium scale grating 13. Rays in group $s = 0$ were isolated and observed. A micrometer drive was arranged for controlled rotation of the scale grating with respect to the fixed index grating. Moire fringes generated perpendicular to the rulings were counted as a function of angular position.

Results showed that, at any point in the field, $$N = \beta d/g_c \qquad (7)$$

where $d$ is displacement of the coarse scale grating measured normal to the rulings of the index grating $N$ is change of moire fringe order induced at any fixed point in the field of view.

Significantly, sensitivity—or fringes per unit displacement—is amplified by the fringe multiplication factor. From Eq. (2), the limiting value of $g_f$ is $\lambda/2$. Accordingly, the maximum sensitivity obtainable is $d = \lambda/2$ per moire fringe. The limiting sensitivity thus equals the sensitivity of optical interferometry with a double-path interferometer.

Dependence Upon Gap

Effects of finite gap between the grating surfaces were investigated. The gratings employed were the 1,200 rulings per mm index grating and the 20 rulings per mm chromium scale grating, producing moire multiplication by 60.

In one set of observations, the incident beam was adjusted to provide symmetrically diffracted zeroth and first order beams, as prescribed by Eq. 2 and illustrated in FIG. 5 when $\theta_o = -\theta_1$. In another set, the angle of incidence, $\alpha$, was altered to produce various ratios of $\theta_o/\theta_1$.

In all cases, light that was isolated and observed was the group whose dominant members experienced diffraction orders 0, 30 and 1, −30 at the index and scale gratings, respectively. This was the condition of superior fringe contrast.

The gap and taper between grating surfaces were varied by introducing paper spacers. Conditions of incidence and observation were set and then the Ronchi ruling was rotated in its plane to minimize fringe density across the field. Thus, moire fringes from rotational mismatch were eliminated and the residual fringes resulted from slight extensional mismatch (deviation from $\beta = 60$) and from gap effect, if any.

TABLE I below shows the experimental conditions and results. It can be deduced that seven fringes were caused by extensional mismatch alone when $0_o = -0_1$.

TABLE I

Gap Effect

| $-\theta_o/\theta_1$ | Gap mm | Taper* | Fringes Across Field | Gap Effect, Fringes |
|---|---|---|---|---|
| 1 | 0.05 | 0 | 7 | 0 |
| 1 | 0.20 | 0 | 7 | 0 |
| 1 | 0.00–0.10 | * | 7 | 0 |
| 1 | 0.10–0.20 | * | 7 | 0 |
| 1 | 0.00–0.10 | ** | 7 | 0 |
| 5/7 | 0.10 | 0 | 5 | 2 |
| ½ | 0.10 | 0 | 3.5 | 3.5 |

| | | | | |
|---|---|---|---|---|
| ⅓ | 0.10 | 0 | 0.5 | 6.5 |
| ⅓ | 0.05–0.10 | ** | −5 | 12 |

*indicates apex of wedge-shaped gap is perpendicular to rulings, and
**indicates apex is parallel to rulings.
0 indicates no taper.

These results, taken together with the results of the section Dependence on S-Group, show that number, inclination and shape of moire fringes are independent of both gap and obliquity of observation, if $\theta_o = -\theta_1$. Consequently, symmetry of the two dominant intergrating beams is the paramount condition for uniqueness of the contour map generated by moire fringes.

TABLE I also shows that gap and taper are responsible for extraneous fringes when $\theta_o \neq -\theta_1$. The dependence is moderate, however, when gap and taper are small, and small deviations from the condition of symmetry would have negligible influence.

ADDITIONAL PERFORMANCE CONSIDERATIONS

Fringe Contrast

The main causes of degradation of fringe contrast are:

1. unequal intensities of the two dominant diffractions from the index grating,
2. low signal-to-noise ratio in diffraction orders used to form the pattern,
3. excessive width of light source when gap between grating surfaces is significantly large.

Unequal Intensities

Ideally, the intensities of the two dominant diffractions, $a$ and $a+1$, should be equal, and they should be large compared to the non-dominant diffractions. When mated with a symmetrically diffracting coarse grating, the beams that experience diffractions $a$, $\beta/2$ and $a+1$, $-\beta/2$ would have equal intensities and combine in two-beam interference. Optimum contrast then appears when $s = 0$.

When intensities of $a$ and $a+1$ are unequal, contrast cannot be perfect for $s = 0$. However, considerable inequality can be tolerated before contrast becomes poor. For example, when two beams of intensity ratio 4:1 enter into interference, the interference fringe intensity maxima and minima are in the ratio 9:1, which yields high contrast.

In addition, when contrast is not perfect with groups $s = 0$, it is likely to be more nearly perfect in a nearby group. This occurs for diffraction sequences $a$, $\beta/2 + s$ and $a+1$, $-\beta/2 + s$ when the intensities, I, diffracted into each order are most closely related by $$I_a/I_{a+1} = I_{-(\beta/2)+s}/I_{+(\beta/2)+s}$$

In practice, the observer can survey the patterns for s-groups near $s=0$ and choose the pattern of maximum contrast.

Signal-to-Noise Ratio

When a grating is illuminated by collimated monochromatic light, most of the light emerges in a system of discrete directions. However, as a result of random errors existing throughout the ruling, a portion of the light scatters out in every direction. This scattered light can be considered as a background noise superimposed upon the signal of diffracted light. Similar effects are caused by dirt and blemishes and these add to noise in more localized regions.

This optical noise adds background intensity to the moire pattern. In cases where the intensity of the moire pattern itself becomes so feeble as to be overwhelmed by the background intensity, no fringes are visible. In cases where signal and noise are of the same order of magnitude, fringes appear with reduced contrast; and where the fringes are very strong compared to the background intensity, the noise is of no consequence.

The variation of intensity with diffraction order for pure bar-and-space gratings is treated in elementary texts. Intensity diminishes rapidly and is very small for high orders, e.g., for the twenty-fifth order.

Since diffraction orders of $\beta/2$ or slightly higher are used, the beams that form the moire pattern are relatively weak when $\beta$ is a large number. Then, the noise level must be relatively low. Of the two, the coarse grating is usually responsible for the greater contribution of noise. For large multiplication factor, i.e., large $\beta$, the coarse grating must be clean and must have smooth, sharply defined bars and spaces. With the chromium Ronchi ruling used in the aforementioned experiments, the signal-to-noise ratio was sufficiently high to produce good fringe contrast up to the eightieth order; with a photographic grating of 20 rulings per mm, up to the twenty-fifth order; and with another relatively crude photographic grating of 20 rulings per mm, only the tenth order.

The maximum multiplication factor with this chromium grating exceeds 160. Excellent contrast was obtained in the aforementioned experiments at $\beta=60$. With the said photographic gratings, maximum multiplication factors are about 50 and 20, respectively. Accordingly, the grating signal-to-noise ratio may be a limiting factor for multiplications near two orders of magnitude, while multiplications near one order of magnitude are virtually unrestricted.

When fringe contrast is significantly reduced by optical noise, some improvement is afforded by minimizing aperture 27 in the focal plane of the decollimating lens. An aperture larger than that required for resolution of the moire fringes admits the scattered light (noise) in larger proportion than the directed light (signal).

Width of Source

For a given grating separation, the permissible source width decreases as pitch of the index grating decreases. When the said grating of 1,200 rulings per mm was used with a gap of 0.05 mm, excellent contrast was achieved with angular width of source of 1/700. Noticeable contrast degradation occurred with twice this source width. An angular width of source of 1/500 was used with all the other aforesaid gratings, since this produced sufficient illumination for convenient observation.

In practical applications of moire fringe multiplication, there would seldom be need for a gap greater than 0.05 mm. Under this condition, the permissible width of source is sufficiently large that contrast degradation can be easily avoided.

Index Grating Design

Blazed Phase Gratings

Figures 6, 7:
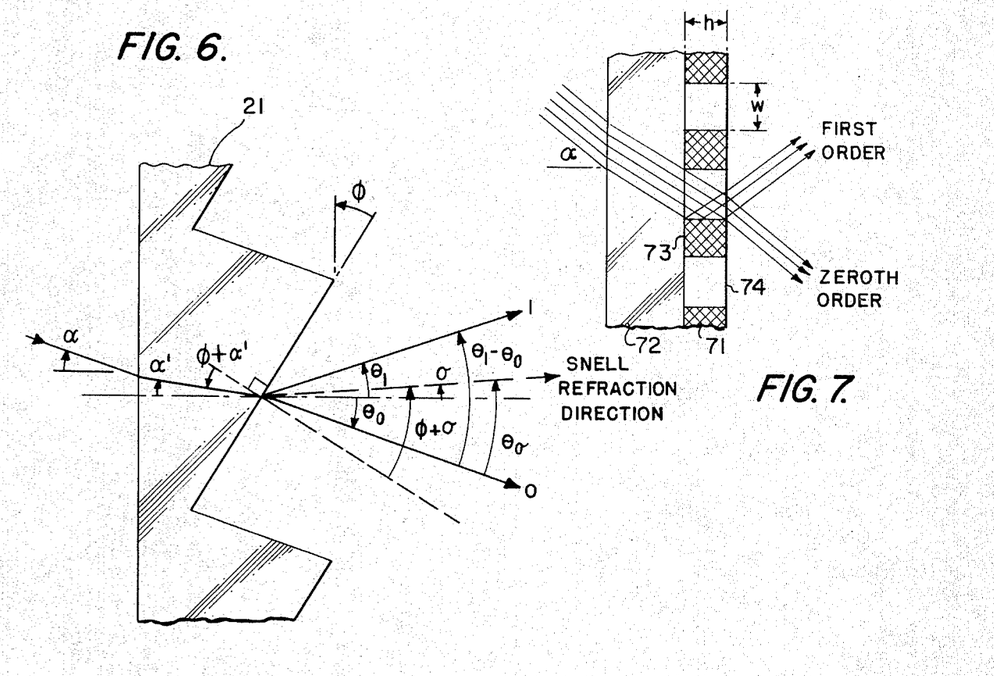
FIG. 6 is a cross-sectional view illustrating one type of index grating that produces neighboring double-order dominance.
FIG. 7 is a cross-sectional view illustrating another type of index grating that produces neighboring double-order dominance.

A phase grating blazed for dominance in two neighboring orders may be used for the index grating. FIG. 6 shows the prescribed directions of incidence ($d$) and emergence of zeroth and first order diffractions ($\theta_o$, $\theta_1$) for the fine reference grating. Diffraction angles depend upon grating pitch and wavelength of illumination. Grating blaze angle, $\phi$, controls the energy distribution. If $\phi$ is such that the natural direction of refraction—as calculated by Snell's Law—is the same as the direction of the first order diffraction, then most of the energy emerges in the first order. However, if the natural refraction direction falls between the zeroth and first order diffraction directions, as shown in the figure, most of the energy appears in these diffraction orders. Neighboring double-order dominance results.

Referring to FIG. 6, angles $\alpha$, $\theta_o$, and $\theta_1$ are given by Eqs. 1 and 2. Snell's refraction direction, $\theta_\sigma$, is calculated by these relationships $$\sin \alpha' = 1/n \sin \alpha$$
$$\sin (\phi+\sigma) = n \sin (\phi+\alpha') \quad (9)$$

$$\theta_\sigma = \sigma - \theta_o$$

where $n$ is refractive index of the grating material and where clockwise angles in the figure are negative.

Refraction angle $\theta_\sigma$ was calculated for the five reference gratings used in the aforesaid experiments, with illumination at wavelength $\lambda = 5,461$ A. The ratio of refraction to diffraction angles, $\theta_\sigma /(\theta_1-\theta_o)$, is listed in TABLE II below.

TABLE II.—INTENSITY VS. DIFFRACTION ORDER

| Grating | | Relative intensity †* in diffraction order | | | | | Ratio dominant intensities, $I_1/I_o$ | Calculated*° $\theta_\sigma/(\theta_1-\theta_o)$ |
|---|---|---|---|---|---|---|---|---|
| Rulings per mm | Blaze angle, $\phi$ | −2 | −1 | 0 | 1 | 2 | | |
| 200 | 6°00′ | 6 | 15 | 100 | 91 | 5 | .91 | .55 |
| 360 | 10°22′ | 5 | 13 | 100 | 68 | 5 | .68 | .52 |
| 400 | 13°54′ | 5 | 11 | 52 | 100 | 4 | 1.92 | .64 |
| 600 | 17°27′ | 5 | 17 | 100 | 57 | ...... | .57 | .53 |
| 1200 | 26°45′ | ...... | ...... | 100 | 26 | ...... | .26 | .41 |

† For angle of incidence $\alpha$ as prescribed by Eq. 1.
*For wavelength 5461A.
°$n = 1.566$.

Relative intensities of light output in each diffraction order was measured with a photomultiplier type photometer, and given in TABLE II. The ratio of intensities of the two dominant diffractions, $I_1/I_o$, was found to vary around the ideal value of unity. A graph of $I_1/I_o$ vs. $\theta_\sigma /(\theta_1-\theta_o)$ was plotted and the faired curve crossed $I_1/I_o = 1$ at $$\theta_\sigma /(\theta_1-\theta_o) = 0.57 \quad (10)$$

One might anticipate equal sharing of energy when the Snell refraction direction bisects the angle between zeroth and first order diffractions. Actually, equal sharing is achieved when the refraction is slightly larger than this, namely, 0.57 of the angle. In selecting or designing a reference grating, this should be a primary criterion. When selecting from listings of standard gratings, blaze angle $\phi$ should be chosen such that Eq. 10 is most nearly satisfied. If the optical system allows variation of wavelength, $\lambda$ can be chosen to improve or perfect the fit to Eq. 10.

Thick Amplitude Gratings

Double-order dominance can be achieved with a bar-and-space grating if the thickness of the bars is sufficient to block or grossly attenuate all diffraction orders except the zeroth and first orders. This condition is illustrated in cross-sectional view in FIG. 7, wherein 71 is the grating layer on transparent substrate 72. Opaque bars 73 and transparent zones 74 comprise the grating.

When thickness h of the grating layer is related to width $w$ between adjacent bars by $$w = 2hR \sin\alpha / \sqrt{n^2 - \sin^2\alpha} \quad (11)$$

where $n$ is the index of refraction of the transparent zone 74, equal intensities emerge in the zeroth and first diffraction orders. Emergent light of the zeroth order is unobstructed while that of the first order experiences Bragg reflection. Light of all negative diffraction orders is obstructed and light of all diffraction orders exceeding one is greatly attenuated as a result of inefficient reflection (since the Bragg condition is not satisfied) and as a result of obstruction. Coefficient R depends upon the material comprising the grating layer and is determined experimentally. R is primarily influenced by the Bragg reflection coefficient, which depends upon angle of incidence $\alpha$.

A thick amplitude grating of this type can be made by exposing a silver-based, high contrast, high resolution photographic plate to two coherent beams of light intersecting at an angle $2\alpha$. For such conditions, when $\alpha$ is near 30°, R is approximately 0.9. Other photosensitive materials can also be used. Pitch $g_f$ of the index grating thus produced is given by $$g_f = \lambda/2 \sin\alpha \quad (12)$$

Thin Amplitude Gratings

If the thickness h of opaque bars is small compared to pitch $g_f$, the grating is thin. Double-order dominance is usually not achieved with thin amplitude gratings. However, when angle of incidence is as prescribed by Eq. 1 and $g_f = 3\lambda/2$, the diffraction angle of orders 2 and −1 are 90° from the normal to the grating. Consequently, when $$g_f \leq 3/2\lambda \quad (13)$$

the only diffraction orders contained in the transmitted light are the zeroth and first orders. The result is double-order dominance. For practical applications, the intensities of these dominant orders are sufficiently close to being equal when the width of opaque bars equals or exceeds the width of transparent spaces.

Thin amplitude gratings that satisfy these requirements may be produced by photoetching the array of bars in an evaporated metal coating on a glass substrate. The photo-sensitive resist may be exposed to two beams of coherent light intersecting at an angle $2\alpha$ to generate the grating pattern.

Reflection Configuration

Figure 8:
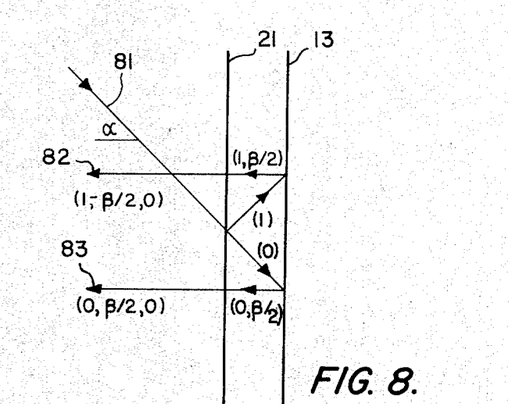
FIG. 8 illustrates the diffractions experienced by dominant rays for the reflection equivalent of the optimum configuration.

A reflection configuration equivalent to the transmission configuration of FIG. 5 is shown in FIG. 8. Incident light 81, at angle $\alpha$, is divided by index grating 21 into two dominant components of orders 0 and 1. After reflection at scale grating 13 and subsequent transmission of the index grating in the zeroth diffraction order, dominant components 82 and 83 emerge and combine to form the moire multiplication pattern. As in the case of transmission, these components form group $s = 0$. Rays that experience diffraction orders $(o, \beta/2 + s, 0)$ and $1, -\beta/2 + s, 0)$ at the three successive encounters with the gratings, constitute the adjacent $s$-groups. As in the case of transmission, observations shound be made in the $s$-group that exhibits optimum fringe contrast.

PREFERRED IMPLEMENTATION

1. In a preferred implementation for moire fringe multiplication by a factor of 50, the optical elements are arranged as in FIG. 2. Scale 13 is a precision Ronchi ruling of 40 rulings per mm (or 1,000 per inch), formed as evaporated chromium bars on a glass substrate. The ruling is 20 mm (or 0.8 in.) long by 1 m(or 40 in.) wide. Index grating 21 has 2,000 rulings per mm (or 50,000 per inch), and has an active area 15 mm (or 0.6 in.) square, bordered by an opaque mask. It is an evaporated chromium bar-and-space grating on a glass substrate, constituting a thin index grating. The gratings are illuminated by a collimated beam of blue light centered at 4400A, of 25 mm. (or 1 in.) diameter, incident at $\alpha = -26.1°$. The receiving system isolates and processes transmitted light of group $s = 0$. The receiving system, conditioning and counting system is arranged such that the least count corresponds to one-fourth of a fringe. The system discriminates between forward and backward motion. Sensitivity is one-half micron (or 20 microinches) per fringe, and one-eighth micron (or 5 microinches) per count.

2. In another preferred implementation, all conditions are the same as prescribed in Case (1) above, except the index grating is a phase grating with blaze angle of 43°, formed in a transparent material of refractive index 1.60. The resultant sensitivity is identical.

3. In another preferred implementation for multiplication by 50, the elements are arranged as in FIG. 4. The receiving system isolates and processes reflected light of group $s = 0$. The gratings are identical to those prescribed in Case (1) above, and the resultant sensitivity is identical.

4. In another preferred implementation, all conditions are the same as prescribed in Case (3) above, except the scale length is 25 cm (or 10 in.) and the receiving, conditioning and counting system is arranged such that the least count corresponds to 1/20 fringe. Sensitivity is one-half micron (or 20 microinches) per fringe and 0.025 microns (or 1 microinch) per count.

5. In another preferred implementation for multiplication by 10, conditions are the same as prescribed in Case (2) above, except for the index grating and angle of incidence. Here, the index grating has 400 rulings per mm (or 10,000 per inch) and a blaze angle of 9.5°. Angle of incidence is $-5°$. Sensitivity is 2.5 microns (or 0.0001 in.) per fringe, and 0.6 microns (or 25 microinches) per count.

In prior art attempts are made to enhance the resolution of measuring apparatus by treating electrical output signals in a special way. In contrast to this, the present invention enhances resolution of measuring apparatus by treating the optical signal itself. More specifically, signal generating systems utilizing gratings (here called moire systems) are governed by the relationship $$I = a \cos 2\pi B d/g_c$$

or else by another cyclic function of the same frequency, where $I$ is intensity of the light output signal
 $a$ is a constant
 $\beta$ is an integer called fringe multiplication factor
 $g_c$ is pitch of the scale grating
 $d$ is displacement of scale grating relative to the index grating.

In traditional designs, $\beta = 1$, or in special circumstances it may equal a small integer, for example $\beta = 2$. With fringe multiplication, however, $\beta$ may be a relatively large integer; $\beta = 50$ was specified in several preferred implementations of the method. Accordingly, for a given scale displacement $d$, many more cycles of light oscillation are produced when fringe multiplication is utilized. Then, high resolution of displacement measurements can be obtained even with relatively simple signal processing techniques.

It will be obvious to those skilled in the art that various changes may be made without departing from the scope of the invention and the invention is not to be considered limited to what is shown in the drawings and described in the specification.

What is claimed is:

1. Apparatus in which the position of a table is determined by moire fringe multiplication comprising
 a table and base device,
 a coarse scale grating attached to one element of said device comprised of said table and its base,
 an index member in the form of a diffraction grating of frequency approximately a whole number $\beta$, exceeding three, times the frequency of said scale grating fixed to the other element of said table and base device in juxtaposition to said scale grating,
 an illumination means radiating a systematic bundle of rays obliquely upon said index member,
 whereupon said index member causes two dominant components of said rays to emerge with approximately symmetrical obliquities in the space between said index member and said scale grating,
 said two dominant components being subsequently diffracted by said scale grating, causing them to emerge from said arrangement of scale grating and index member as two sets of subcomponent rays, with a multiplicity of pairs of said subcomponent rays, each pair comprised of a member from each set, traveling in a systematic sequence of diffracted directions,
 optical filtering means which subsequently intercepts said pairs of subcomponent rays and allows only one pair to proceed, namely, a favored pair that proceeds in a direction approximately normal to the plane of the scale grating,
 observing means that intercepts the said favored pair and senses the state of interference generated by said favored pair, said state of interference being manifest as fringes called moire fringes,
 and interpretation means to compare and indicate relative position of said table in relation to said base from changes of the said moire fringes.

hibits dominant intensities in transmission for two neighboring diffraction orders.

6. The apparatus of claim 4 in which said index member is an amplitude grating that exhibits dominant intensities in transmission for two neighboring diffraction orders.

7. The apparatus of claim 4 in which said index member is a phase grating that exhibits dominant intensities in transmission for two neighboring diffraction orders.

8. The apparatus of claim 1 in which said scale grating is a bar-and-space type phase grating.

9. The apparatus of claim 8 in which said index member is a non-symmetrical blazed phase grating that exhibits dominant intensities in transmission for two neighboring diffraction orders.

10. The apparatus of claim 8 in which said index member is an amplitude grating that exhibits dominant intensities in transmission for two neighboring diffraction orders.

11. The apparatus of claim 1 in which said scale grating is a symmetrically diffracting phase grating.

12. The apparatus of claim 11 in which said index

2. The apparatus of claim 1 in which said index member is a non-symmetrical blazed phase grating that exhibits dominant intensities in transmission for two neighboring diffraction orders.

3. The apparatus of claim 1 in which said index member is an amplitude grating that exhibits dominant intensities in transmission for two neighboring diffraction orders.

4. The apparatus of claim 1 in which said scale grating is a bar-and-space type amplitude grating.

5. The apparatus of claim 4 in which said index member is a non-symmetrical blazed phase grating that exhibits member is a non-symmetrical blazed phase grating that exhibits dominant intensities in transmission for two neighboring diffraction orders.

13. The apparatus of claim 11 in which said index member is an amplitude grating that exhibits dominant intensities in transmission for two neighboring diffraction orders.

14. The apparatus of claim 1 in which said index member is a phase grating that exhibits dominant intensities in transmission for two neighboring diffraction orders.

15. The apparatus of claim 1 in which said favored pair of subcomponent rays emerges by transmission through said scale grating after one member of said favored pair experiences diffraction orders $a$, $\beta/2 + s$ while the other member experiences diffraction orders $a + 1$, $-\beta/2 + s$, where the two terms separated by a comma represent diffraction orders at the said index member and said scale grating, respectively, and where $a$ is a small whole number including zero and $s$ is a whole number between $-\beta$ and $\beta$.

16. The apparatus of claim 1 in which said favored pair of subcomponent rays emerges by reflection from said scale grating and subsequen transmission through said index member and one member of said favored pair experiences diffraction orders $a$, $\beta/2 + s$, 0, while the other member experiences diffraction orders $a + 1$, $-\beta/2 + s$, 0, where the three terms separated by commas represent diffraction orders experienced upon encountering the index member, scale grating and again the index member, respectively, and where $a$ is a small whole number including zero and $s$ is a whole number between $-\beta$ and $\beta$.

* * * * *